P. CHILIMIDOS.
CAMERA TIMING ATTACHMENT.
APPLICATION FILED JAN. 17, 1920.
1,344,440.
Patented June 22, 1920.
2 SHEETS—SHEET 1.
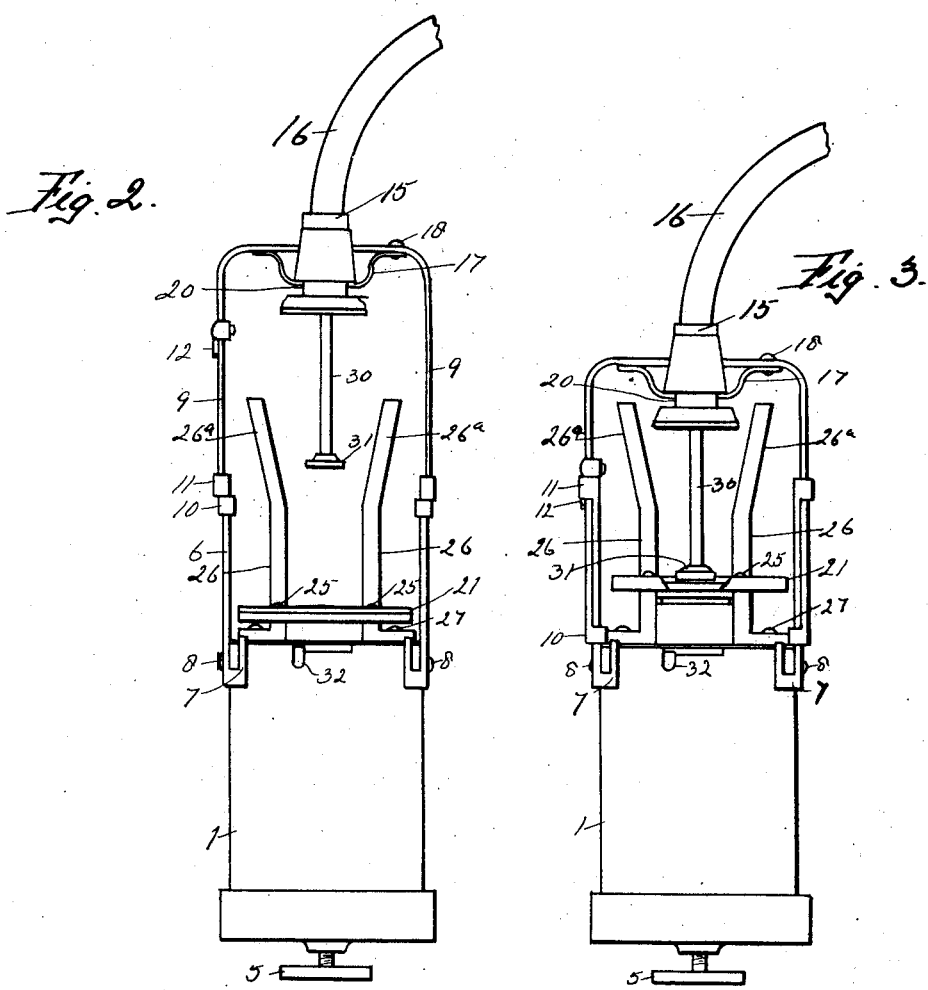
Inventor
Periclis Chilimidos
By W. W. Williamson
Atty.

P. CHILIMIDOS.
CAMERA TIMING ATTACHMENT.
APPLICATION FILED JAN. 17, 1920.
1,344,440.
Patented June 22, 1920.
2 SHEETS—SHEET 2.
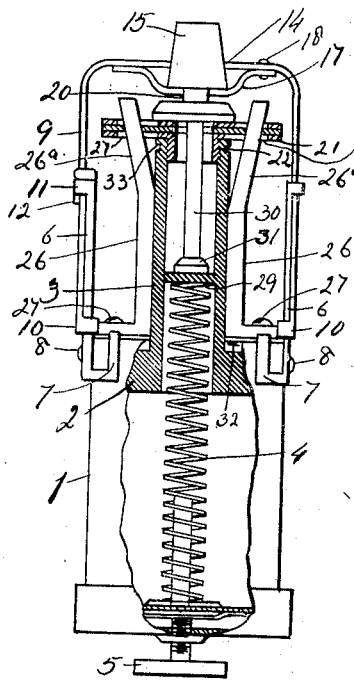
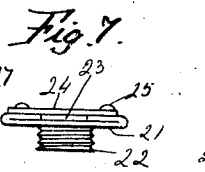
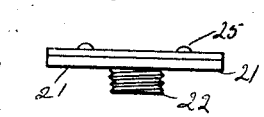
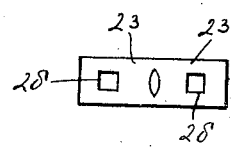
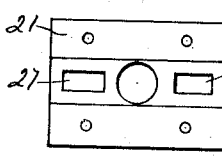
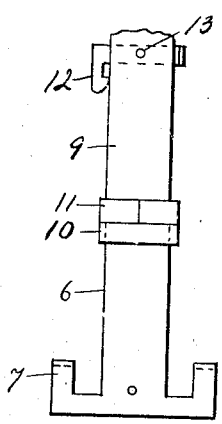
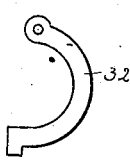
Inventor
Perictis Chilimidos
By W. W. Williamson
Atty.

UNITED STATES PATENT OFFICE.

PERICLIS CHILIMIDOS, OF SOUTH BETHLEHEM, PENNSYLVANIA.

CAMERA-TIMING ATTACHMENT.

1,344,440.  Specification of Letters Patent.  Patented June 22, 1920.

Application filed January 17, 1920. Serial No. 352,194.

*To all whom it may concern:*

Be it known that I, PERICLIS CHILIMIDOS, a citizen of the United States, residing at South Bethlehem, in the county of Northampton and State of Pennsylvania, have invented new and useful Improvements in Camera-Timing Attachments, of which the following is a specification.

My invention relates to a new and useful improvement in camera timing attachment, and has for its object to provide an exceedingly simple and effective device of this description which may be readily attached to the shutter tripping mechanism of a camera after which it will serve to time the actuating of the shutter tripping mechanism and automatically release the same enabling the operator to so time the exposure of the camera to take a proper position to be included in the photograph.

A further object of my invention is to provide for the actuation of the shutter controlling mechanism in such manner as to both open and close the shutter of the camera thus preventing an over exposure.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Figure 1, is an upper end view of my improved timer.

Fig. 2, is a side elevation thereof showing the slidable yoke in its distended position and the actuating head held in its normal lowered position.

Fig. 3, is a view similar to Fig. 2 showing the slidable yoke in its lowered position the actuating head being represented as moving upward and carrying with it the shutter release.

Fig. 4, is a view similar to Fig. 3 showing the actuating head as having reached the upper end of its stroke and the shutter release as having been freed and returned to its normal position after having been pushed upward sufficiently to open the shutter, parts of the device being broken away and sectioned to clearly illustrate the construction.

Fig. 5, is a plan view of the actuating head showing the cam rods therein.

Fig. 6, is an edge view of Fig. 5.

Fig. 7, is an end view of Fig. 5.

Fig. 8, is a plan view of the sliding plates upon which the shutter release head bears.

Fig. 9, is a view similar to Fig. 5 with the top plate and slide plates removed.

Fig. 10, is an enlarged view of a portion of the yoke.

Fig. 11, is an enlarged detail view of the latch for releasing the actuating head.

In carrying out my invention as here embodied, 1 represents the body of the timer having a piston 2 fitted to slide therein from which piston projects the piston rod 3 through the top of the device and this piston is actuated in one direction by the coil spring 4 and controlled in its upward movement by the air lock screw 5 as is usual in this class of devices.

6 represents two uprights which form parts of a yoke the lower ends of these uprights being in the form of a T head 7 for holding them in an upright position when secured in place by the screws 8.

9 represents the sliding portion of the yoke which is secured upon the uprights 6 by the lower ends of said yoke being clipped around said standards as indicated at 10 the upper ends of the standards being clipped around the arms of the yoke as indicated at 11. This permits the upper portion of the yoke to be slid up and down as the case requires and in order that the sliding portion may be held in its lowered position I provide a latch 12 which is pivoted at 13 and is adapted to enter into engagement with one of the clips 11.

The central portion of the sliding yoke 9 has a U shaped notch 14 therein for the reception of the lower end 15 of the ordinary cable release 16. A spring bridge 17 is pivoted at 18 to the underside of the central portion of the yoke and this spring bridge also has formed therein a U shaped notch 19 for the accommodation of the shank 20 carried by the end 15 by which arrangement the release cable may be readily and securely attached to the yoke or detached therefrom.

21 represents the actuating head which has a threaded shank 22 adapted to be threaded into the upper end of the piston rod 3 this head consisting of a plate having its edges inturned upon the body thereof so as to produce a channel into which is fitted the slide plates 23 the latter being held in place by the top plate 24 secured upon the head by the screws 25.

26 represent two cam arms which are secured to the body of the device by the screws 27 these arms extending upward parallel with the piston rod to a certain height and then diverging therefrom as indicated at 26ª, said rods passing through the slits 27 in the actuating head and also through slots 28 in the sliding plates. By this arrangement the sliding plates 23 will be moved back and forth within the channel in the head when said head is moved up or down as will be readily understood.

The piston rod is hollow, its interior being divided by the web or partition 29 the lower portion accommodating the upper end of the spring 4 while the upper portion accommodates the stem 30 of the cable release 16 which stem is provided with a foot piece 31 for bearing upon the upper surface of the sliding plates 23 for the purpose hereinafter set forth.

From the foregoing description the operation of my improvement will be obviously as follows:—

The device having been attached to the cable release of a camera and the piston forced down against the action of this spring 4 to its lowest position and there locked by the usual latch 32 entering into the groove 33 formed in the piston rod, the stem 30 of the cable release will assume its distended position, the foot piece thereof contacting with the sliding plates 23.

When the parts are in this position the sliding plates are closed so that when the piston rod is released and the actuating head moved upward therewith the stem 30 will also be moved upward until the diverging portions of the rods 26 open the sliding plates sufficiently to permit the foot piece 31 to pass therebetween when the stem will be free to move downward under the influence of the usual spring contained in the cable release. Thus the actuation of the stem 30 to and fro will be effected after the manner of hand operation—that is to say the stem 30 will be first pushed into the cable release sufficiently to actuate the shutter mechanism of the camera in one direction and then released so that it may freely move outward for permitting the reversed action of the shutter therefrom effecting the timing of the picture in the same manner as when hand actuated.

The timing of the upward movement of the piston and consequently the actuating head is effected in the usual manner by the air lock screw 5 by the regulation of which the piston will be permitted to move at a greater or less rate of speed and when properly timed the person taking the photograph may after focusing the camera take the proper position to be included in the picture this being done during the time the piston is moved upward.

After the piston rod and head have moved upward or outward to the limit of the stroke and the stem 30 has sprung into the interior of the piston rod as shown in Fig. 4 it is necessary to withdraw this stem before resetting the piston rod and head for otherwise the sliding will close in upon the stem and jam the mechanism. This is accomplished by unlatching the yoke and moving it outward to the position shown in Fig. 2 sufficiently to draw the stem from out of the piston rod.

Now by resetting the piston the yoke may be reset and latched bringing the foot piece of the stem in contact with the upper surface of the sliding plates 23.

By the use of my improvement a picture may be taken of the operator as effectually as though the camera operated manually and the films or plates will not be over exposed since the sudden releasing of the stem of the cable release will permit the shutter mechanism to operate in its predetermined time shutting off the light to the camera.

Of course I do not wish to be limited to the exact details of construction as herein shown as these may be varied within the limits of the appended claims without departing from the spirit of my invention.

Having thus fully described my invention, what I claim as new and useful is:—

1. In an automatic camera timing device having a spring actuated air regulated piston, means for attaching the device to the release mechanism of a camera, a hollow piston rod, a head carried by the piston rod, plates fitted to slide upon the head, cam rods passing through said plates for actuating the same in unison with the movements of the head, said plates serving to actuate the stem of the release mechanism in one direction and release said stem in order that it may be actuated in the reversed direction.

2. In combination with the cable release of a camera having a spring actuated stem, a timing device consisting of means for attachment to said cable release, a spring actuated air controlled piston, a hollow rod carried by said piston, a head mounted upon the outer end of the rod, plates fitted to slide upon said head, means for actuating said plates in unison with the movement of the head whereby the stem of the cable release may be actuated in one direction and then released.

3. In a device of the character described a body having a spring actuated air controlled piston therein, a hollow rod carried by the piston, a head attached to the outer end of said rod, plates adapted to slide upon said head, cam rods secured to the body and projecting through the head and plates so as to move the latter back and forth when the head is moved in and out, a sliding yoke, and means for locking said yoke in its normal position, means carried by the yoke for attachment to the cable release of a camera.

4. In combination with the spring actuated air controlled piston of a camera timing device, a hollow rod carried by the piston, a head threaded through the outer end of said rod, two plates adapted to slide upon said head, a plate for holding the first named plates in position upon the head, and cam rods projecting through slots formed in said head and plates.

5. In combination with the spring actuated air controlled piston of a camera timing device, a hollow rod carried by the piston, a head threaded through the outer end of said rod, two plates adapted to slide upon said head, a plate for holding the first named plates in position upon the head, cam rods projecting through slots formed in said head and plates, uprights carried by the body of the device, a yoke fitted to slide upon said uprights, and means carried by the yoke for attaching the device to the cable release of a camera.

In testimony whereof I have hereunto affixed my signature.

PERICLIS CHILIMIDOS.